US008685584B2

(12) United States Patent
Cho et al.

(10) Patent No.: US 8,685,584 B2
(45) Date of Patent: Apr. 1, 2014

(54) METHOD FOR REMOVING RESIDUAL WATER FROM FUEL CELL (75) Inventors: Kyu Taek Cho, Gyeonggi-do (KR); Jong Jin Yoon, Seoul (KR); Jong Hyun Lee, Gyeonggi-do (KR); Matthew M. Mench, State College, PA (US); Ahmet Turhan, State College, PA (US)

(73) Assignees: Hyundai Motor Company, Seoul (KR); The Penn State Research Foundation, University Park, PA (US)

( * ) Notice: Subject to any disclaimer, the term of this patent is extended or adjusted under 35 U.S.C. 154(b) by 553 days.

(21) Appl. No.: 12/544,816

(22) Filed: Aug. 20, 2009

(65) Prior Publication Data

US 2011/0045365 A1    Feb. 24, 2011

(51) Int. Cl.
*H01M 8/04*    (2006.01)
(52) U.S. Cl.
USPC .......................................... 429/450; 429/428
(58) Field of Classification Search
None
See application file for complete search history.

(56) References Cited

U.S. PATENT DOCUMENTS

| 2006/0121322 A1* | 6/2006 | Haas et al. | 429/13 |
| 2006/0222924 A1* | 10/2006 | Matsuoka | 429/34 |
| 2010/0190076 A1* | 7/2010 | Fagley et al. | 429/439 |

FOREIGN PATENT DOCUMENTS

| JP | 2004-039526 A | 2/2004 |
| JP | 2004-179086 A | 6/2004 |
| JP | 2005-100775 A | 4/2005 |
| KR | 2008-043821 | 5/2008 |

* cited by examiner

*Primary Examiner* — Ula C Ruddock
*Assistant Examiner* — Tony Chuo
(74) *Attorney, Agent, or Firm* — Edwards Wildman Palmer LLP; Peter F. Corless (57) ABSTRACT The present invention provides a method for removing residual water in a fuel cell, which controls the humidity of purge gases to effectively remove residual water in the fuel cell and to maintain the humidity in a membrane at a constant level, thus ensuring the durability of the membrane.
For this purpose, the present invention provides a method for removing residual water in a fuel cell, characterized in that the relative humidities of purge gases supplied to an anode and a cathode are controlled to selectively reduce water content in the fuel cell and water content in a membrane.

4 Claims, 11 Drawing Sheets

Fig. 1

PRIOR ART

METHOD FOR REMOVING RESIDUAL WATER FROM FUEL CELL

BACKGROUND (a) Technical Field

The present disclosure relates to a method for removing residual water in a fuel cell, in which the humidity of purge gases is controlled to effectively remove residual water in the fuel cell and to maintain the humidity of the membrane at a nearly constant level, thus ensuring enhanced durability of the membrane.

(b) Background Art

In general, a polymer electrolyte fuel cell (PEFC) comprises a fuel cell stack in which a plurality of unit cells are stacked. In each unit cell, an anode and a cathode are disposed on both sides of an electrolyte membrane to form a membrane electrode assembly (MEA), and the MEA is disposed between separators (bipolar plates).

In the fuel cell, hydrogen as fuel is supplied to the anode ("fuel electrode") and oxygen in air is supplied to the cathode ("air electrode" or "oxygen electrode").

The hydrogen supplied to the anode is dissociated into hydrogen ions and electrons by a catalyst disposed in the electrode/catalyst layer. The hydrogen ions are transmitted to the cathode through the electrolyte membrane, which is a cation exchange membrane, and the electrons are transmitted to the cathode through a gas diffusion layer (GDL) and the bipolar plate.

At the cathode, the hydrogen ions supplied through the electrolyte membrane and the electrons transmitted through the bipolar plate react with the oxygen in the air supplied to the cathode to produce water.

The electrochemical reaction occurring in the fuel cell is affected by various factors including the surface area of the catalyst layer in which the reaction occurs, the used hydrogen, the adhesion between the oxygen electrode and the electrolyte membrane, the reaction temperature of the electrodes, and the pressure of reactant gases. Also, the generated current is affected by the factors.

Condensed water and impurities generated at each electrode reduce the active surface area of the catalyst layer to cause a loss to the reaction, thus deteriorating the performance of the fuel cell. Accordingly, the condensed water and impurities generated at each electrode in the fuel cell should be removed properly.

Figure 1:
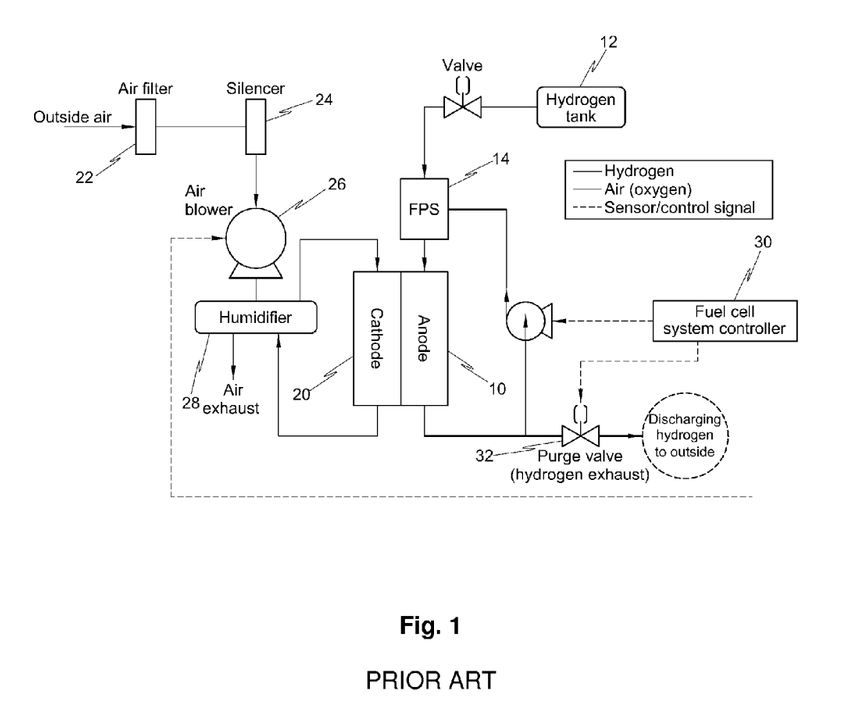
FIG. 1 is a schematic diagram showing a conventional working fluid discharge apparatus for a fuel cell stack.

For these reasons, a working fluid discharge apparatus has been adopted to remove the condensed water and impurities generated at each electrode in the fuel cell. FIG. 1 is a schematic diagram showing a conventional working fluid discharge apparatus for a fuel cell stack.

Referring to FIG. 1, hydrogen containing gas is supplied from a hydrogen tank 12 to an anode 10 through a fuel processing system (FPS) 14, which processes fuel to be dissociated into hydrogen and increases the content of hydrogen.

On the other hand, outside air, i.e., oxygen containing gas is supplied to a cathode 20 through an air filter 22, a silencer 24, an air blower 26, and a humidifier 28.

At this time, the hydrogen ions, electrons and oxygen react to produce condensed water and impurities at the anode 10 and the cathode 20.

The condensed water and impurities generated at the anode 10 are discharged to the outside when a purge valve 32 is opened under the control of a fuel cell system controller 30. That is, hydrogen purging (discharging) is periodically performed to remove the condensed water and impurities generated at the anode 10 of the fuel cell stack, thus maintaining the performance of the fuel cell stack.

Meanwhile, U.S. Pat. No. 7,132,179 (B2) discloses a method for reducing water content in a fuel cell by controlling the humidity of reactant gases by a water balance calculation. Especially, a threshold value below which the stack performance is reduced is set to a critical membrane moisture level such that the water content is not reduced below the threshold value. However, it takes several hours to reach the threshold value, and its applicability is not satisfactory.

In addition, U.S. Pat. No. 6,358,637 discloses a method for removing residual water in a fuel cell using a vacuum pump after a fuel cell system is shut down, which is effective in removing residual water using the vacuum pump when the temperature of the fuel cell is high; however, it requires a significant amount of energy to remove the water content in the fuel cell using the vacuum pump.

Moreover, U.S. Pat. No. 6,864,000 discloses a method for shutting down a fuel cell system including a plurality of fuel cells arranged in a stack, in which the fuel cells are cooled to a shutdown temperature while maintaining a substantially uniform water vapor pressure through the fuel cells whereby migration of water within the fuel cells during cooling is reduced. However, this method is still not satisfactory.

As discussed above, the prior art methods cannot effectively remove water from the fuel cell to maintain the humidity of the membrane. That is, it may take a long time to remove water and additional power may be required to operate a blower or vacuum pump for removing the water. Additionally, conventional purge methods result in dryout of the membrane, which is known to promote degradation of the membrane.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a method for removing residual water in a fuel cell, characterized in that water content in the fuel cell and water content in the membrane of the fuel cell are selectively reduced by controlling humidity of purge gas supplied to anode relative to humidity of purge gas supplied to cathode.

In a preferred embodiment, dry gas is supplied to the anode and fully humidified gas is supplied to the cathode to reduce the water content in the fuel cell and maintain the relative humidity of the membrane.

In another preferred embodiment, the relative humidities of the fuel gases are controlled during operation of the fuel cell to selectively control the water content in the fuel cell prior to the start of purging.

In still another preferred embodiment, the water content produced during operation of the fuel cell is used to control the water content of the membrane, and the relative humidities of purge gases are controlled to be low to reduce the water content in the fuel cell.

In still yet another preferred embodiment, amounts of fuel gases supplied to the anode and cathode during operation of the fuel cell are controlled to minimize the water content in the fuel cell and maintain the water content in the membrane.

In a further preferred embodiment, amounts of purge gases supplied to the anode and cathode after operation of the fuel cell are controlled to selectively remove the water content in the fuel cell and the water content in the membrane.

In a further preferred embodiment, amounts and relative humidities of fuel gases supplied to the anode and cathode during operation of the fuel cell are controlled to minimize the water content in the fuel cell while maintaining the water content in the membrane.

In a further preferred embodiment, the purge gases supplied to the anode and cathode after operation of the fuel cell have different vapor diffusion rates from each other.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| | |
|---|---|
| 101: | anode GDL |
| 102: | membrane |
| 103: | cathode GDL |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

As discussed above, the present invention provides a method for effectively removing residual water in a fuel cell by controlling the humidity of purge gases and/or fuel gases.

Figure 2:
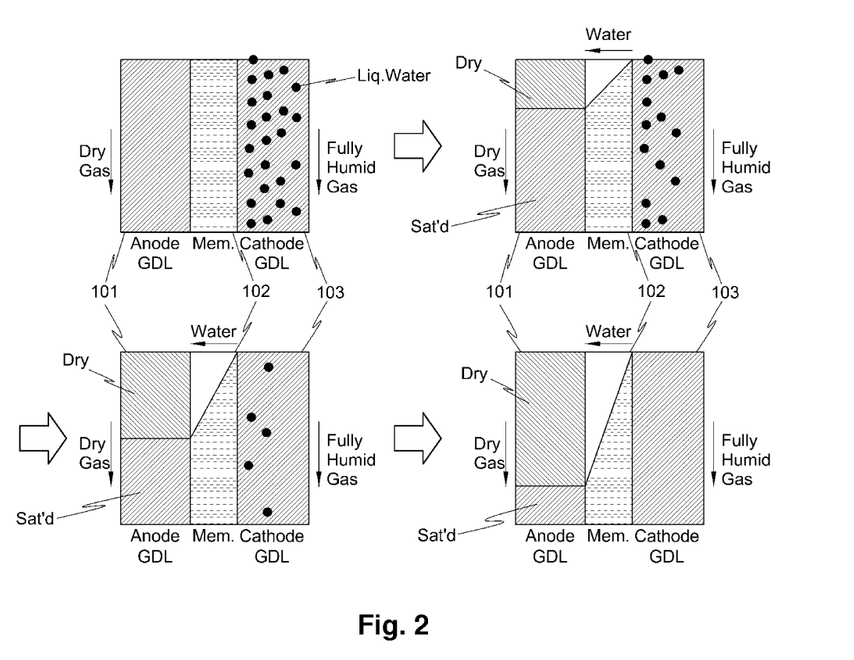
FIG. 2 is a conceptual diagram illustrating a method for removing residual water in a fuel cell in accordance with a preferred embodiment of the present invention.

FIG. 2 is a conceptual diagram illustrating a method for removing residual water in a fuel cell in accordance with a preferred embodiment of the present invention.

As shown in FIG. 2, dry gas at a relative humidity of 0% is supplied to an anode through a bipolar plate, and fully humidified gas at a relative humidity of 100% is supplied to a cathode. At this time, an anode GDL 101 is dried by the dry gas, and subsequently, the water of a cathode GDL 103 passes through the membrane 102 to saturate the anode GDL 101 dried by the dry gas, and thereby the humidity of the membrane is maintained while there is a reduction in water content in the fuel cell.

In this instance, an amount of the fully humidified gas supplied to the cathode may be configured to be three times of an amount of the dry gas supplied to the anode. With such configuration of the amount of the gases, because the water content supplied from the cathode side is much more than the water content dried away at the anode side, the water contents in the membrane and the cathode GDL can be maintained constantly with 100% of water saturation.

Figure 3:
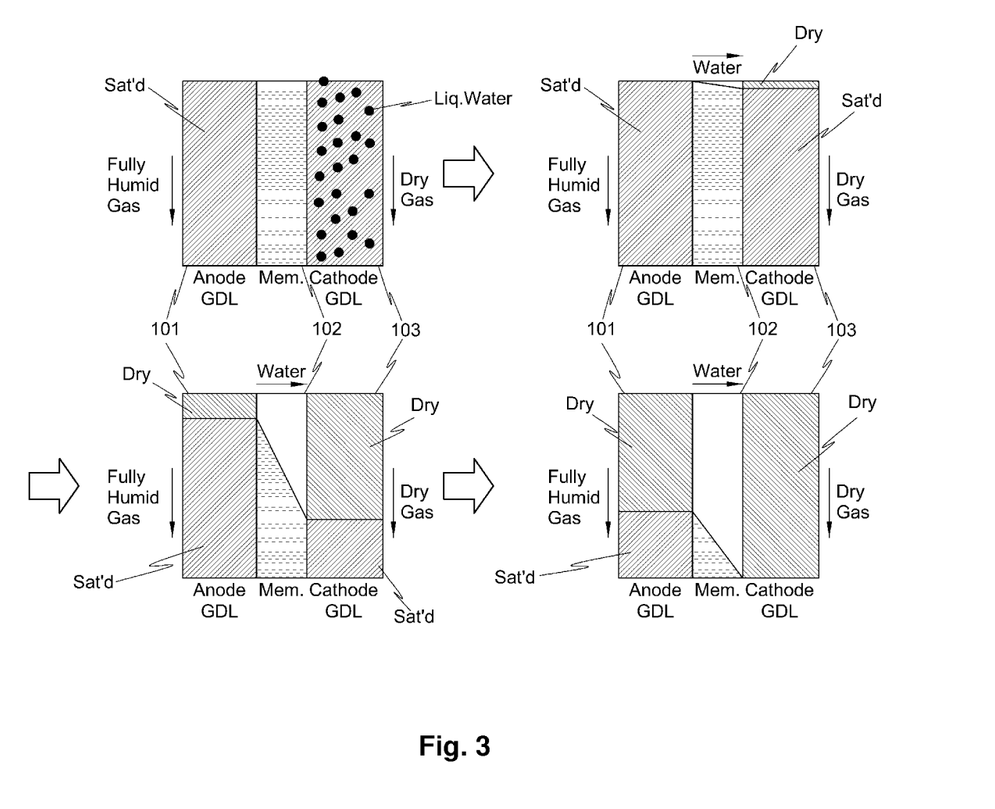
FIG. 3 is a conceptual diagram illustrating a method for removing residual water selectively with controlled humidity of gases for anode and cathode sides.

FIG. 3 is a conceptual diagram illustrating a method for removing residual water in a fuel cell in accordance with a comparative embodiment.

As shown in FIG. 3, fully humidified gas is supplied to the anode GDL 101 through the bipolar plate, and dry gas is supplied to the cathode GDL 103. Then, the cathode GDL 103 is dried by the dry gas, and water of the anode GDL 101 saturated by the fully humidified gas moves through the membrane 102 to the cathode GDL.

In this instance, an amount of the dry gas supplied to the cathode is configured to be three times of an amount of the fully humidified gas supplied to the anode. It means that removal rate of the water at the cathode side would be substantially three times of supplying rate of the water from the anode side, which results in excessive removal of water content from the membrane along with decrease of total water amount in the cell. Therefore, unlike to the preferred embodiment of FIG. 2, the membrane is excessively dried up and the endurance thereof is deteriorated.

During the operation of the fuel cell, the water content in the fuel cell may vary depending on operation range of the fuel cell, relative humidity of the fuel gases, and flow rate of the fuel gases. Specifically, if the fuel cell operates in high-current area, the electro-chemical reaction is actively increased, and water generated in the fuel cell increases accordingly. However, since catalysts layer of the fuel cell are also heated up along the intensive electro-chemical reaction, the generated water at the catalyst layer is soon vaporized and moved toward the GDLs. In this instance, if the fuel gases supplied to electrodes are dry, the vaporized water is then removed from the fuel cell. Namely, before purging process, the water content in the fuel cell can be adjusted by controlling operation range of the fuel cell and relative humidity of the fuel gases even during operation of the fuel cell.

Figure 8:
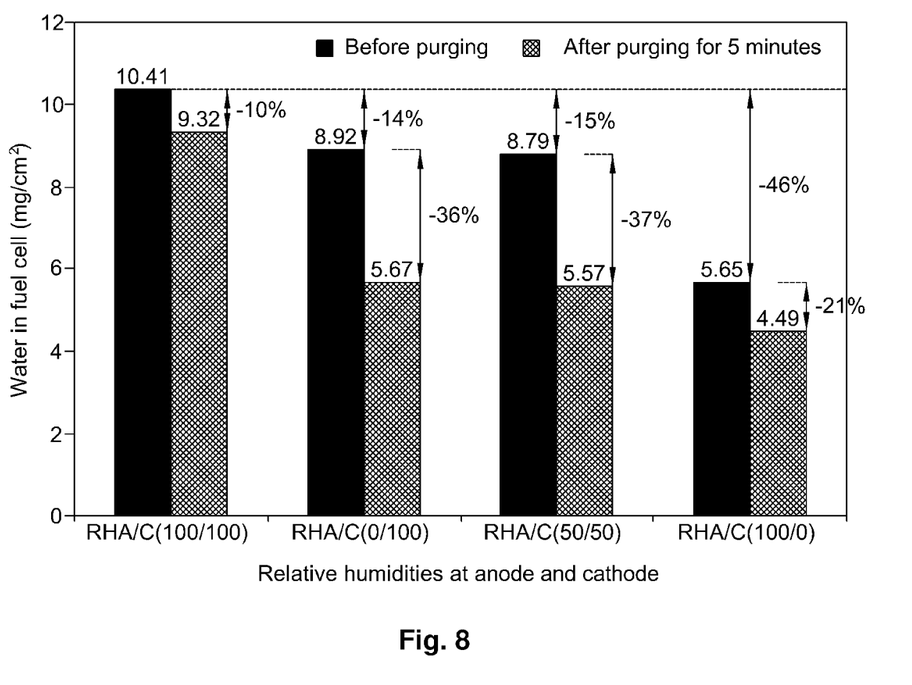
FIG. 8 is a graph showing a change in water content before and after purging under various purging conditions at the operating condition of 1 A/cm$^2$.
Figure 9:
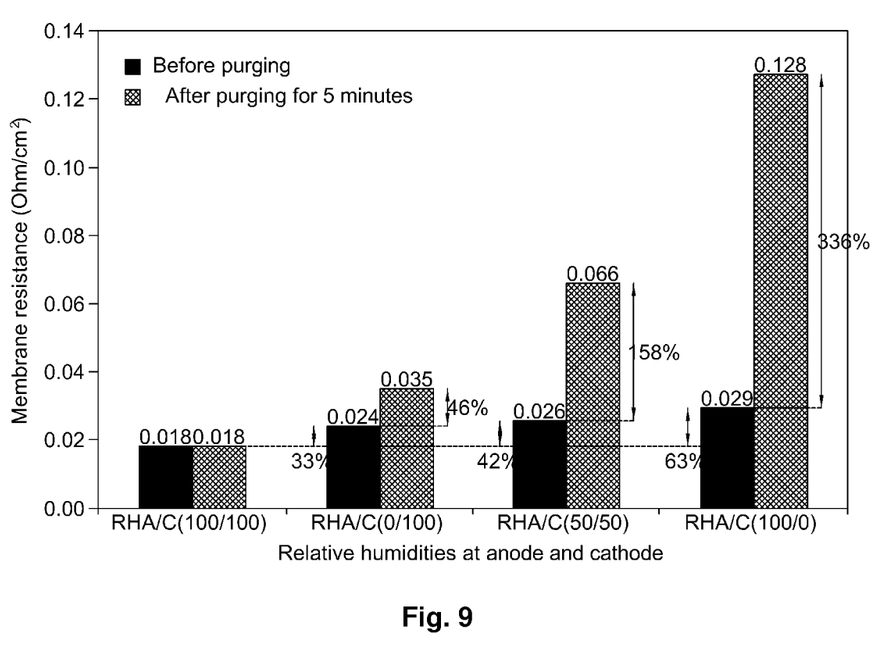
FIG. 9 is a graph showing a change in membrane resistance before and after purging under various purging conditions at the operating condition of 1 A/cm$^2$

As apparent from FIGS. 8 and 9, operating status of the fuel cell before purging is also much important to control the water content in the fuel cell, as well as purging process itself.

Suitably, during operation of the fuel cell, it is preferable to supply dry fuel gas to the anode and humid fuel gas to the cathode such that overall water content in the fuel cell is reduced before purging and it is possible to prevent excessive dry out of the membrane while purging.

EXAMPLES

The following examples illustrate the invention and are not intended to limit the same.

Purge gases were supplied to the anode and the cathode of a fuel cell having an active area of 250 cm$^2$ by varying the relative humidities of purge gases to the anode and the cathode (i.e., 100%/100%, 0%/100%, 100%/0%, and 50%/50%, respectively) after operation with various flow rate and relative humidity of fuel gas at various current conditions. The change in water content of the fuel cell was investigated using neutron imaging and the change in ion conductivity of the membrane 102 was measured with a milliohm meter After operating the cell at each condition (which is the pre-purge condition), loads were turned off at each current level, and the flow rate of purge gases was maintained constant for 5 minutes (purging for 5 minutes).

1. In Case of Relative Humidities of 100%/100% at the Anode and Cathode

Figure 4:
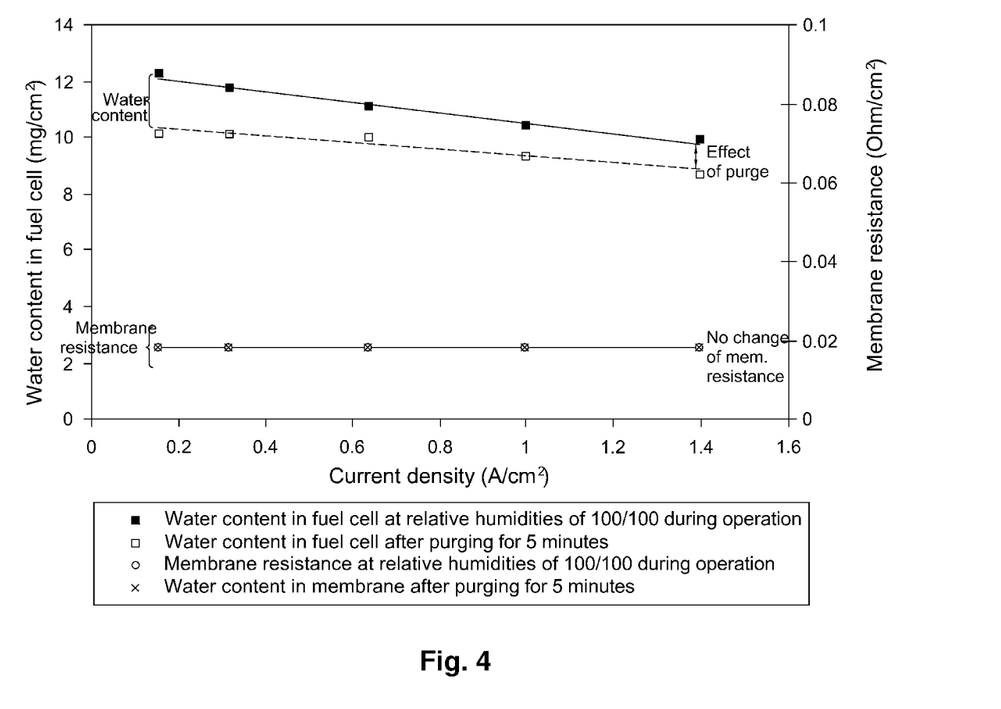
FIG. 4 is a graph comparing membrane resistance and residual water content in the fuel cell at relative humidity of 100%/100% at anode and cathode with respect to current density.

FIG. 4 is a graph comparing the membrane resistance and the residual water content in the fuel cell at relative humidities of 100%/100% at the anode and cathode with respect to current density.

In the graph of FIG. 4, the left vertical axis represents the water content in the fuel cell, the right vertical axis represents the resistance of the membrane 102, the upper two lines indicate that the water content in the fuel cell is reduced before and after purging, and the lower line indicates that there is no change in resistance of the membrane 102.

Accordingly, at the relative humidities of 100%/100% at anode and cathode, while the humidity maintenance of the membrane 102 was excellent (there was no change in resistance of the membrane 102), the removal of the water content was not complete since the water content in the fuel cell was reduced to 8.7 mg/cm$^2$ at the maximum flow rate.

2. In Case of Relative Humidities of 0%/100% at the Anode and Cathode

Figure 5:
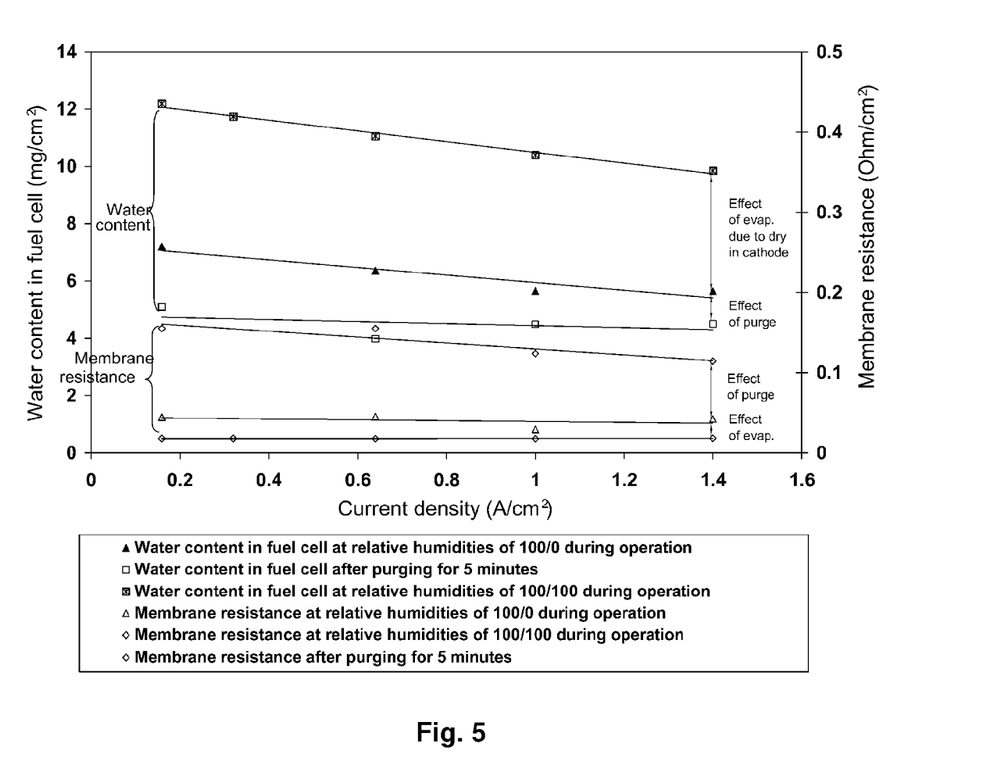
FIG. 5 is a graph comparing membrane resistance and residual water content in the fuel cell at relative humidity of 0%/100% at anode and cathode with respect to current density.

FIG. 5 is a graph comparing the membrane resistance and the residual water content in the fuel cell at relative humidities of 0%/100% at the anode and cathode with respect to current density.

As shown in FIG. 5, at the relative humidities of 0%/100% at the anode and cathode, the resistance of the membrane 102 was increased to 0.0377 Ohm/cm$^2$ after purging at the maximum flow rate (1 A/cm$^2$), and the water content in the fuel cell was significantly reduced to 4.77 mg/cm$^2$. As a result, the increase in the resistance of the membrane 102 compared to the reduction in the water content in the fuel cell was very small.

3. In Case of Relative Humidities of 100%/0% at the Anode and Cathode

Figure 6:
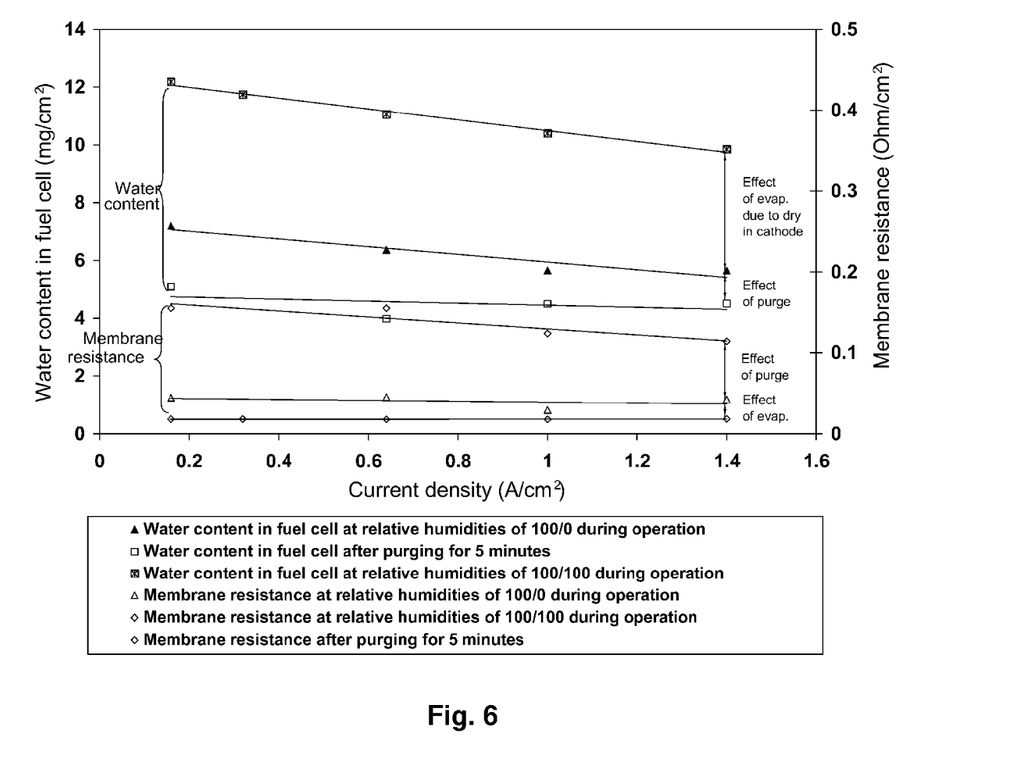
FIG. 6 is a graph comparing membrane resistance and residual water content in the fuel cell at relative humidity of 100%/0% at anode and cathode with respect to current density.

FIG. 6 is a graph comparing the membrane resistance and the residual water content in the fuel cell at relative humidities of 100%/0% at the anode and cathode with respect to current density.

As shown in FIG. 6, at the relative humidities of 100%/0% at the anode and cathode, while the water content in the fuel cell was effectively reduced to 4.5 mg/cm$^2$ after purging at a low flow rate, the resistance of the membrane 102 was increased to 0.15 ohm/cm$^2$, and thereby the membrane 102 was very dry.

4. In Case of Relative Humidities of 50%/50% at the Anode and Cathode

Figure 7:
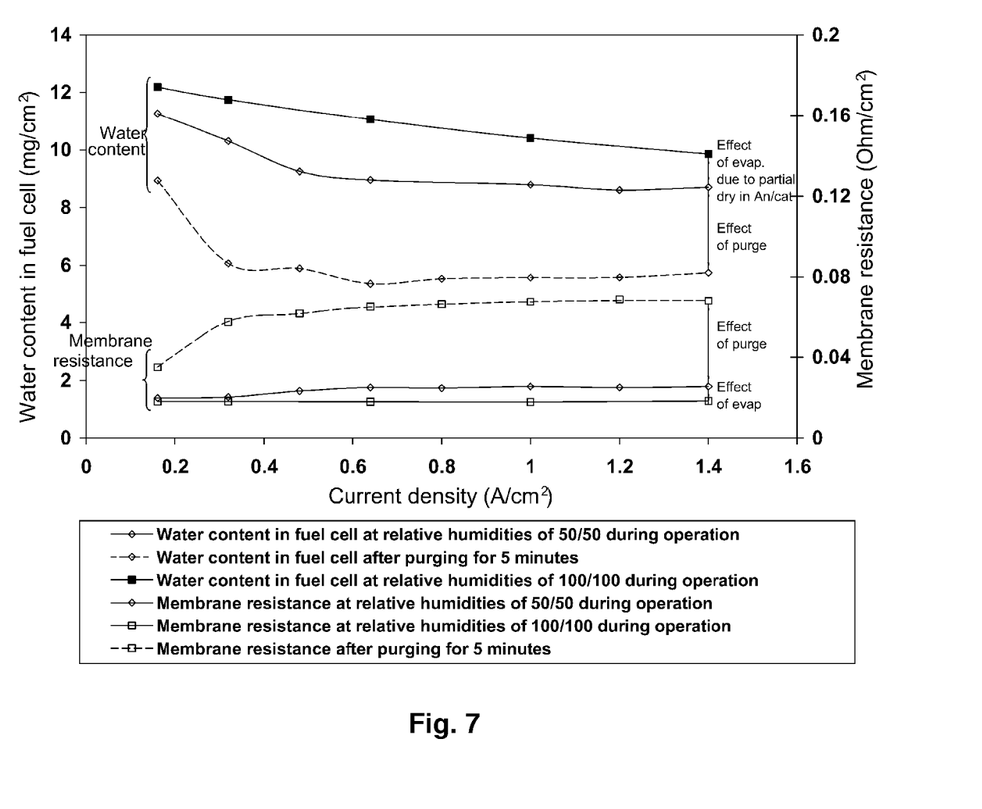
FIG. 7 is a graph comparing membrane resistance and residual water content in the fuel cell at relative humidity of 50%/50% at anode and cathode with respect to current density.

FIG. 7 is a graph comparing the membrane resistance and the residual water content in the fuel cell at relative humidities of 50%/50% at the anode and cathode with respect to current density.

As shown in FIG. 7, at the relative humidities of 50%/50% at the anode and cathode, the water content in the fuel cell was slightly reduced to 5.4 mg/cm$^2$ after purging at a low flow rate (0.64 A/cm$^2$), and the resistance of the membrane 102 was increased to 0.065 ohm/cm$^2$. As a result, a considerable amount of water was removed from the membrane 102.

FIG. 8 is a graph showing a change in water content before and after purging at a flow rate of 1 A/cm$^2$ under various purging conditions, and FIG. 9 is a graph showing a change in resistance of the membrane before and after purging at the same flow rate as FIG. 8 under various purging conditions.

As shown in FIGS. 8 and 9, since the changes in the water content in the fuel cell before and after purging at the relative humidities of 0%/100% and at the relative humidities of 50%/50% were substantially the same, which means that the performances of removing water in the fuel cell were the same. However, the change in resistance of the membrane 102 at the relative humidities of 50%/50% was larger, and therefore it can be seen that the membrane 102 was dried by purging.

At the relative humidities of 100%/0% at the anode and cathode, the performance of removing water in the fuel cell was excellent; however, the membrane was dried substantially, which is not beneficial for longevity of the membrane.

Figure 10:
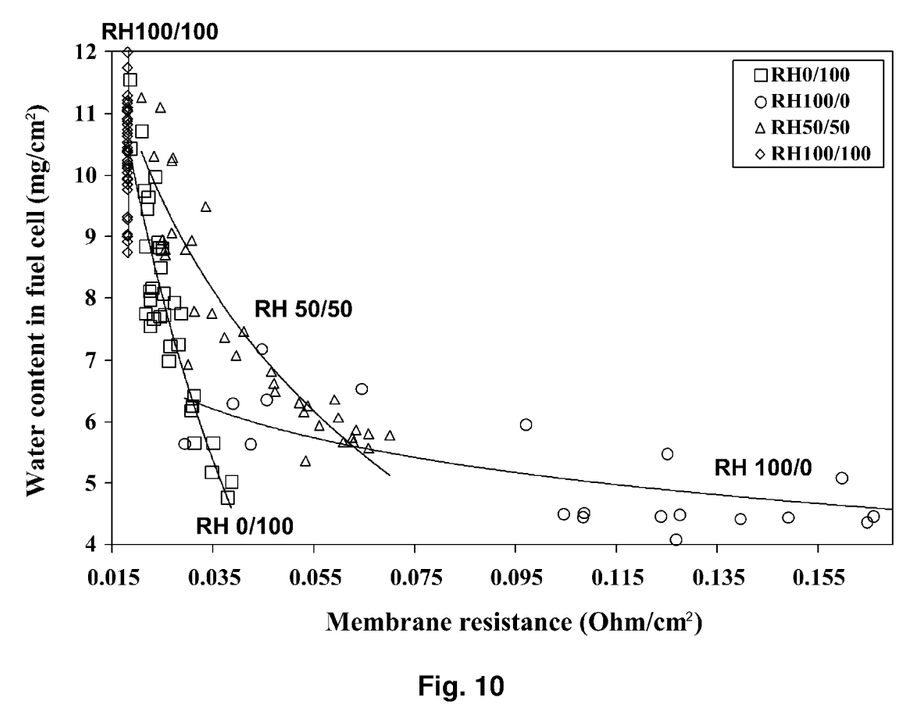
FIG. 10 is a graph showing a change in membrane resistance with respect to water content in the fuel cell under various purging conditions.
Figure 11:
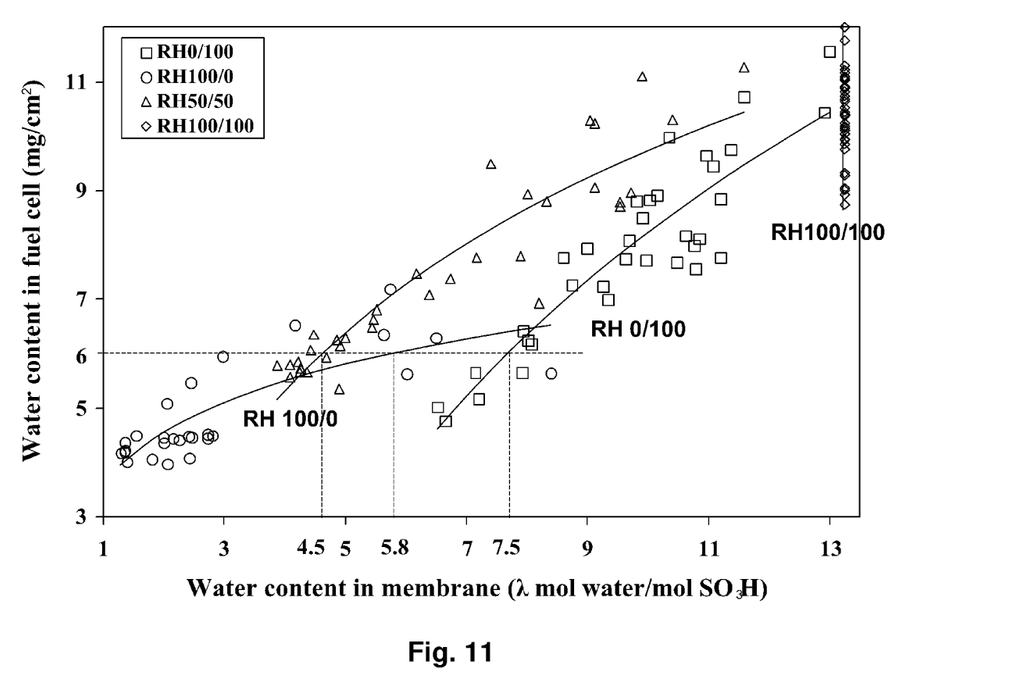
FIG. 11 is a graph showing a change in water content in membrane with respect to water content in the fuel cell under various purging conditions.

FIG. 10 is a graph showing a change in resistance of the membrane 102 with respect to the water content in the fuel cell under various purging conditions, and FIG. 11 is a graph showing a change in water content (λ mol water/mol SO$_3$H) in the membrane 102 with respect to the water content in the fuel cell under various purging conditions.

At the relative humidities of 0%/100% at the anode and cathode, while the change in water content in the fuel cell was significant, the change in resistance of the membrane 102 was very small. At the relative humidities of 100%/0% at the anode and cathode, the change in water content in the fuel cell and the change in resistance of the membrane 102 were all significant. Moreover, at the relative humidities of 50%/50% at the anode and cathode, the change in water content and the change in resistance were intermediate between the two conditions.

For example, if the desired final water amount in the cell is 6 mg/cm$^2$, the water content in the membrane ($\lambda$) will be 7.5 by purge with RH0/100, 5.8 with RH100/0, and 4.5 with RH50/50 as shown in FIG. 11.

That is, it can be seen that the smaller the relative humidity at the cathode is, the flatter the graph showing the relationship between the resistance in the membrane and the water content in the cell is. Accordingly, it is possible to selectively reduce the water content in the membrane and the water content in the fuel cell by controlling the ratio of the anode and cathode purging gas relative humidity.

As described above, according to the method for removing residual water in the fuel cell of the present invention, it is possible to effectively remove residual water in the fuel cell and maintain the relative humidity of the membrane, by controlling the relative humidities of purge gases to selectively control the water content in the fuel cell and the water content in the membrane, thus ensuring the durability of the membrane.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for removing residual water in a fuel cell, comprising:
    selectively reducing water content in the fuel cell and water content in a membrane of the fuel cell by controlling humidity of purge gas supplied to anode relative to humidity of purge gas supplied to cathode of the fuel cell,
    wherein the water content produced during operation of the fuel cell is used to control the water content of the membrane, and the relative humidity of purge gases are controlled to be low to reduce the water content in the fuel cell, and
    wherein the water content of the fuel cell and the water content of the membrane of the fuel cell are selectively controlled,
    wherein dry purge gas is supplied to the anode and fully humidified purge gas is supplied to the cathode to reduce the water content in the fuel cell and maintain the water content in the membrane.

2. The method of claim 1, wherein the relative humidities of the purge gases are controlled during operation of the fuel cell to selectively control the water content in the fuel cell prior to the start of purging.

3. The method of claim 1, wherein the relative humidities of purge gases are controlled under constant conditions during operation of the fuel cell to minimize the water content in the fuel cell and then minimize the amount of required purge gases.

4. The method of claim 1, wherein amounts of purge gases supplied to the anode and cathode after operation of the fuel cell are controlled to selectively remove the water content in the fuel cell and the water content in the membrane.

* * * * *